May 1, 1928. 1,667,820
A. REINSBERG ET AL
EMERGENCY WHEEL ATTACHMENT
Filed Feb. 19, 1927
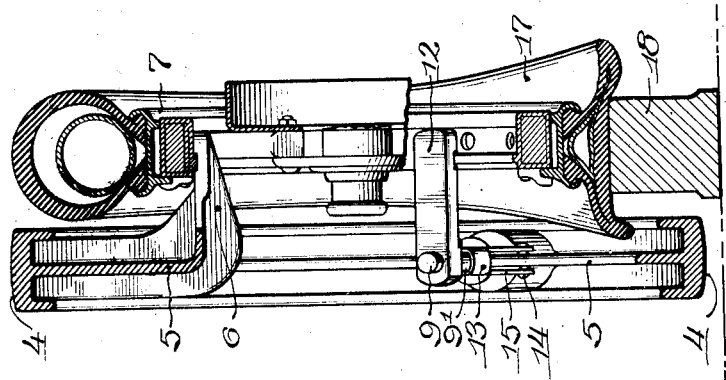
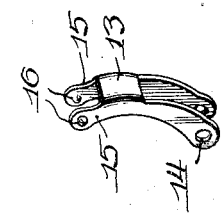
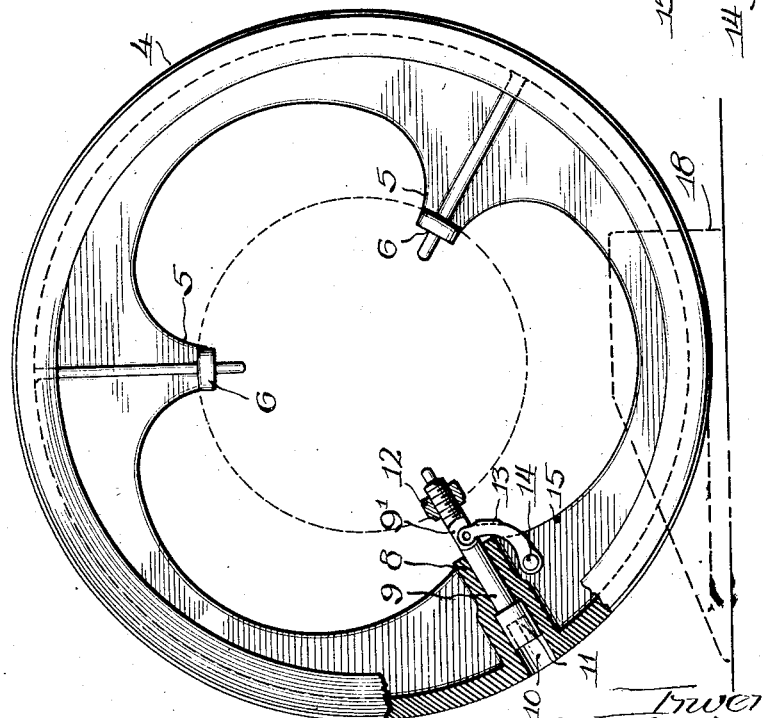

Patented May 1, 1928.

1,667,820

UNITED STATES PATENT OFFICE.

ADOLPH REINSBERG, OF CHICAGO, ILLINOIS, AND HARRY ROSENZWEIG, OF TOLEDO, OHIO.

EMERGENCY-WHEEL ATTACHMENT.

Application filed February 19, 1927. Serial No. 169,439.

The invention relates to emergency wheel attachments.

It relates particularly to emergency rims adapted to be secured to a vehicle wheel when a pneumatic tire has become deflated because of a puncture or other causes.

The object of the invention is to provide an emergency rim of simple construction, comprising but few parts, and which is adapted to be easily and quickly applied to a wheel to carry its proportion of the load.

In the accompanying drawings illustrating a selected embodiment of the invention:

Fig. 1 is a side elevation of the emergency rim shown partly in section.

Fig. 2 is a transverse sectional view showing the emergency rim applied to an automotive vehicle wheel.

Fig. 3 is a detail perspective view of the latch.

Referring to the drawings the invention comprises a complete rim having a tread 4 and a skeleton web preferably shaped to provide spoke-like members 5 projecting radially of the wheel. We contemplate providing three of these spoke members, symmetrically disposed about the rim. Two of the members are provided with fixed jaws 6 which project laterally from the web and a sufficient distance to engage the vehicle wheel 7 when the emergency rim is positioned alongside the vehicle wheel. We prefer to construct the emergency rim so that the jaws 6 will engage the inner side of the felly of the wheel, and to construct the jaws to make interlocking engagement with the felly.

In order to lock the emergency rim to the automotive wheel, one of the spoke-like members is provided with a radial opening 8 to accommodate a bolt 9. The opening 8 is counter-bored at 10 to accommodate the enlarged head 11 on one end of the bolt and this head is provided with a socket recess to receive a wrench in a familiar manner. The other end of the bolt projects inwardly from the spoke member and is threaded to receive a movable jaw 12 which projects laterally from the emergency rim, like the fixed jaw 6, to engage the felly 7 of the vehicle wheel. A latch 13 is pivoted at 14 on the web 5 and it is provided with arms 15 which are adapted to embrace a square portion 9' on the bolt and are preferably intended at 16 to make secure frictional contact with the bolt for preventing rotation of the bolt when the emergency rim is in use. The arms 15 are indented at 16 to make effective frictional contact with the web.

When a tire 17 becomes deflated from any cause the vehicle wheel is elevated sufficiently to permit the emergency rim to be fastened thereto. This is easily accomplished by providing a wedge lock 18 and running the vehicle wheel into elevated position thereon, as shown in Fig. 2. Then the fixed jaws 6, 6 are engaged with the felly of the vehicle wheel and the movable jaw 12 is positioned for engagement with the felly. The latch being released, a socket wrench is applied to the bolt 9 and the latter is turned until the jaw 12 is clamped tightly against the felly, thereby locking the emergency rim rigidly upon the vehicle wheel. The latch is then swung into engagement with the squared part 9' of the bolt to prevent the bolt from rotating and loosening while the emergency rim is in use.

The invention is simple in construction, it embodies comparatively few parts, it can be manufactured at relatively low cost, and it can be easily and quickly applied to a vehicle wheel for emergency service without requiring special strength or skill. The jaws will be shaped to make an interlocking fit with the felly and one emergency rim may be constructed for use with a number of different kinds or makes of vehicle wheels, the only requirement being that there shall be such an engagement of jaws with the felly of the vehicle wheel that the emergency rim can be used in actual service without becoming displaced from the vehicle wheel. However, it may be necessary or desirable to make the emergency rims for vehicle wheels of particular kinds or makes, and changes may be made in the emergency rim to adapt it for different vehicle wheels or for other purposes and we reserve the right to make all such changes as fairly fall within the scope of the following claims.

We claim:

1. An emergency rim comprising a plurality of laterally projecting jaws adapted to engage a vehicle wheel when the emergency rim is positioned alongside of the vehicle wheel, one of said jaws being movable, means extending radially through said rim for adjusting said movable jaw to clamp all the jaws in engagement with the vehicle wheel and to lock the emergency rim thereto, and means pivotally mounted on the side of the rim for holding said first named means in fixed position.

2. An emergency rim comprising a plurality of laterally projecting jaws adapted to engage a vehicle wheel when the emergency rim is positioned alongside of the vehicle wheel, one of said jaws being movable, a rotatably mounted bolt extending radially through the rim and having threaded engagement with the movable jaw whereby the movable jaw may be adjusted to clamp all the jaws in engagement with the vehicle rim and to lock the emergency wheel thereto, and means pivotally mounted on the side of the rim for holding the bolt in fixed position.

3. An emergency rim comprising an annular member, spoke-like members projecting inwardly from the rim, rigid jaws on some of said members projecting laterally therefrom to engage a vehicle wheel when the emergency rim is positioned alongside of the vehicle wheel, a movable jaw also adapted to engage the vehicle wheel, means extending through the rim and another spoke-like member for carrying and adjusting said movable member, and means pivotally mounted on the side of the rim for maintaining said first named means in fixed position.

4. An emergency rim comprising spoke-like members projecting inwardly from the rim, rigid jaws on some of said members projecting laterally therefrom to engage a vehicle wheel when the emergency rim is positioned alongside of the vehicle wheel, a movable jaw also adapted to engage the vehicle wheel, means arranged in another spoke-like member for carrying and adjusting said movable member, and means for securing said carrying means in adjusted position.

5. An emergency rim comprising spoke-like members projecting inwardly from the rim, rigid jaws on some of said members projecting laterally therefrom to engage a vehicle wheel when the emergency rim is positioned alongside of the vehicle wheel, a movable jaw also adapted to engage the vehicle wheel, a bolt rotatably mounted in one of the spoke-like members and having on one end a head to receive a tool for turning the bolt, the other end of the bolt having threaded engagement with the movable jaw, whereby by turning the bolt the movable jaw may be adjusted to clamp and lock the emergency rim on the vehicle wheel, and means for securing said bolt in adjusted position.

ADOLPH REINSBERG.
HARRY ROSENZWEIG.